(12) United States Patent
Grand et al.

(10) Patent No.: US 7,567,061 B2
(45) Date of Patent: Jul. 28, 2009

(54) BATTERY EQUALIZATION USING A PLUG-IN CHARGER IN A HYBRID ELECTRIC VEHICLE

(75) Inventors: Kerry E. Grand, Chesterfield, MI (US); Venkatapathi Raju Nallapa, West Bloomfield, MI (US); Fazal U. Syed, Canton, MI (US); Ming L. Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 11/652,899

(22) Filed: Jan. 12, 2007

(65) Prior Publication Data
US 2008/0169138 A1    Jul. 17, 2008

(51) Int. Cl.
*H02J 7/04*   (2006.01)
*H02J 7/16*   (2006.01)
*H02J 7/00*   (2006.01)

(52) U.S. Cl. ..................... 320/132; 320/104; 320/149; 320/162; 903/906; 903/907

(58) Field of Classification Search ............... 320/104, 320/127, 128, 134, 136, 137, 138, 167, 119, 320/116, 132, 148
See application file for complete search history.

(56) References Cited

U.S. PATENT DOCUMENTS

| 5,081,365 | A | 1/1992 | Field et al. | |
|---|---|---|---|---|
| 5,631,532 | A | 5/1997 | Azuma et al. | |
| 5,659,237 | A | 8/1997 | Divan et al. | |
| 5,659,240 | A | 8/1997 | King | |
| 6,225,780 | B1 | 5/2001 | Koch | |
| 6,559,621 | B2 * | 5/2003 | Corless et al. | 320/103 |
| 6,659,213 | B2 | 12/2003 | Kubo et al. | |
| 2002/0171397 | A1 * | 11/2002 | Adrian et al. | 320/119 |
| 2006/0022639 | A1 * | 2/2006 | Moore | 320/116 |
| 2006/0033475 | A1 | 2/2006 | Moore | |
| 2006/0091857 | A1 * | 5/2006 | Nakanishi et al. | 320/116 |
| 2006/0132085 | A1 * | 6/2006 | Loubeyre | 320/104 |
| 2006/0152189 | A1 * | 7/2006 | Ambrosio et al. | 320/104 |

FOREIGN PATENT DOCUMENTS

| EP | 1139481 | 4/2001 |
|---|---|---|
| EP | 1316457 | 4/2003 |
| GB | 2141296 | 12/1984 |

\* cited by examiner

*Primary Examiner*—Edward Tso
*Assistant Examiner*—Ahmed Omar
(74) *Attorney, Agent, or Firm*—David B. Kelley; MacMillan, Sobanski & Todd, LLC

(57) ABSTRACT

In a hybrid electric motor vehicle, a power supply system for storing and supplying electrical power includes a motor-generator located onboard the vehicle, driveably connected to the vehicle wheels and producing AC electric power, an energy storage device for alternately storing and discharging electric power, an inverter coupled to the motor-generator and the energy storage device for converting alternating current produced by the motor-generator to direct current transmitted to the energy storage device, and for converting direct current stored in the energy storage device to alternating current transmitted to the motor-generator, a source of AC electric power located external to the vehicle, and a charger coupled to said electric power source and the energy storage device for supplying DC electric power to the energy storage device from said AC electric power source.

2 Claims, 2 Drawing Sheets

BATTERY EQUALIZATION USING A PLUG-IN CHARGER IN A HYBRID ELECTRIC VEHICLE

BACKGROUND OF THE INVENTION

1. Field of the Invention

The preferred embodiment relates generally to an electric power supply system and method for charging an electric storage battery of a hybrid electric vehicle.

2. Description of the Prior Art

The powertrain of a hybrid electric vehicle includes multiple power sources, an internal combustion engine (ICE), principally used when highway speeds are sustained; an electric motor for charging electric storage batteries; and a traction motor for launching the vehicle, i.e., for accelerating the vehicle from a stopped condition.

Generally, when using sealed lead acid batteries, a constant voltage charge method is the preferred means for charging battery cells. Under a constant voltage regime currents are limited by the internal resistance of the battery. When the battery is in a low state of charge and the internal resistance is low, in-rush currents can be very large and energy can be restored to the battery very quickly. As the battery becomes charged, it reaches a transition point where a sudden rise in internal resistance occurs and, under constant voltage, the battery will accept less and less current. This self-regulating effect prevents overcharging of the battery, leading to longer battery lifetimes. Such constant voltage charge regimes are conducted at an equalization voltage, which is the recommended voltage at which the batteries can be maintained at a high state of charge (SOC).

After this transition a low current equalization charge is required to return the complete capacity of the battery and to ensure that the individual cells within the battery are brought to an approximately equal charge state.

Most of the charging and discharging of the battery is done in a bulk region below the transition point.

Conventional hybrid electric vehicle powertrains perform battery equalization using an electric motor driven by the ICE as a battery charger. Control of the equalization process is difficult due to the mismatch in power ratings of the electric motor-ICE combination and the battery power required to perform a precise overcharge/equalization of the storage battery.

There is a need in the industry for a system and method that provides an equalization charge to a storage battery in a hybrid electric system using a power source other than those onboard the vehicle. There is a need for a system and method that uses customized battery power limits in a hybrid electric powertrain system to improve battery equalization for a vehicle with a plug-in charger.

SUMMARY OF THE INVENTION

In a hybrid electric motor vehicle, a power supply system for storing and supplying electrical power includes a motor-generator located onboard the vehicle, driveably connected to the vehicle wheels and producing AC electric power, an energy storage device for alternately storing and discharging electric power, an inverter coupled to the motor-generator and the energy storage device for converting alternating current produced by the motor-generator to direct current transmitted to the energy storage device, and for converting direct current stored in the energy storage device to alternating current transmitted to the motor-generator, a source of AC electric power located external to the vehicle, and a charger coupled to said electric power source and the energy storage device for supplying DC electric power to the energy storage device from said AC electric power source.

Advantages of the plug-in device and system include precise equalization of the battery efficiently, optional choice of the energy source ICE or public utility grid, and more flexibility in the design of the hybrid architecture including the size of the charger, charge integration and battery charge topology.

The energy storage battery being charged by the system is equalized very infrequently, perhaps every three to four months. The electric storage system employs only one storage battery, no second electric storage battery, which would add unnecessary weight to the system and vehicle, is required in addition to the storage battery being charged. A second storage battery external to the vehicle would add cost, lower system charge efficiency, and double the equalization problem because it must be charged periodically.

The energy storage device has the flexibility of being replenished by the ICE or a source external to the vehicle, such as the electrical utility power grid.

The ICE may continue to operate and provide energy to drive a load up to a certain state of charge, after which the utility power grid supplies energy to the storage battery.

Using customizable battery power limits an electric machine/ICE can be used to bring the battery pack to a high (about 90%) SOC, then a plug-in charger can be used to perform a precise overcharge and equalization. Use of alternate power sources, the electric machine and ICE separately or in combination and an external power source, provide control flexibility toward optimizing cost associated with each of the power sources. For example, when fuel prices are relatively low compared to the cost of the external power source, the ICE would be used to provide the bulk charge of the energy storage device, i.e., to charge the battery pack to the high SOC, and the external power source and charger would be used for the equalization charge, i.e., from a high SOC to a maximum (about 100%) SOC. But when fuel costs rise relative to those of utility power source, the ICE would be used to provide a bulk charge to the energy storage device that is proportionately lower than the high SOC, and the external power source and charger would be used for an equalization charge that is proportionately greater than a low (about 10%) SOC.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
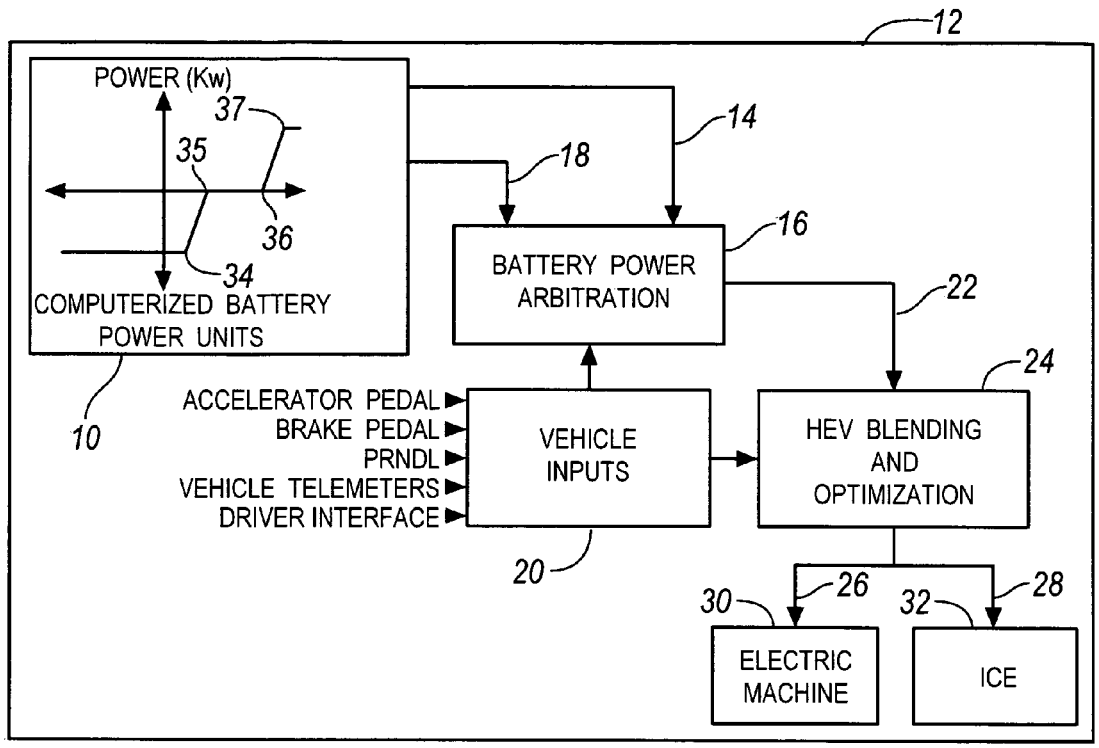
FIG. 1 is schematic diagram of a hybrid electric vehicle battery power control system.

Turning first to FIG. 1, a piecewise linear transfer function 10, stored in electronic memory accessible to a controller 12, relates the state of charge (SOC) of an onboard electric storage battery to the magnitude of power produced by the battery, i.e., the battery power request 14. A battery power arbitration control algorithm 16 receives input signals representing the current battery power request 14, current battery internal parameters (such as SOC, battery temperature, internal resistance, open circuit voltage) 18, and various vehicle inputs 20, including accelerator pedal position, brake pedal displacement, the position of the gear selector lever or PRNDL, the current degree of vehicle telematics usage, and driver interfaces. The algorithm 16 produces as its output a signal representing a arbitrated desired battery power 22. In response to input signals representing vehicle inputs 20 and the arbitrated desired battery power 22, a hybrid electric vehicle (HEV) blending and optimization algorithm 24 produces output command signals 26, 28, which are used as input to an electric machine 30, and an internal combustion engine 32 (ICE), which signals are used optimally to charge an energy storage device, such as an electric storage battery, using the two power sources 30, 32.

The battery power request 14 is a dead band piecewise linear function consisting of four points: a battery power lower saturation limit 34, a zero point lower saturation limit 35, a zero point upper saturation limit 36, and a upper point battery point upper saturation limit 37.

Figure 2:
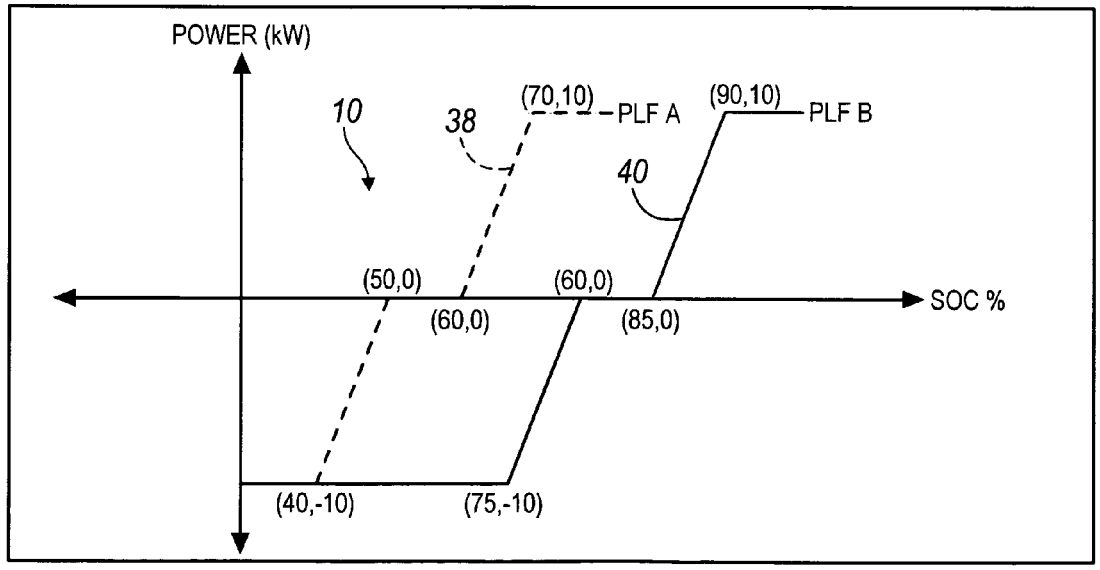
FIG. 2 is the transfer function shown in FIG. 1 relating battery SOC and the battery power request.

FIG. 2 illustrates an example of the battery power request transfer function 10 before any changes (PLF A) 38 and after the electric motor/ICE charges the battery pack during the drive cycle PLF B) 40. In this way, the magnitudes of the variables represented by the four points 34-37 of the transfer function are modified during the drive cycle using a battery charger. For the illustrated example, the system used to modify the battery power request shifts transfer function 38 rightward to the position of transfer function 40, thereby allowing the vehicle to remain at a higher SOC capacity prior to recharge.

Figure 3:
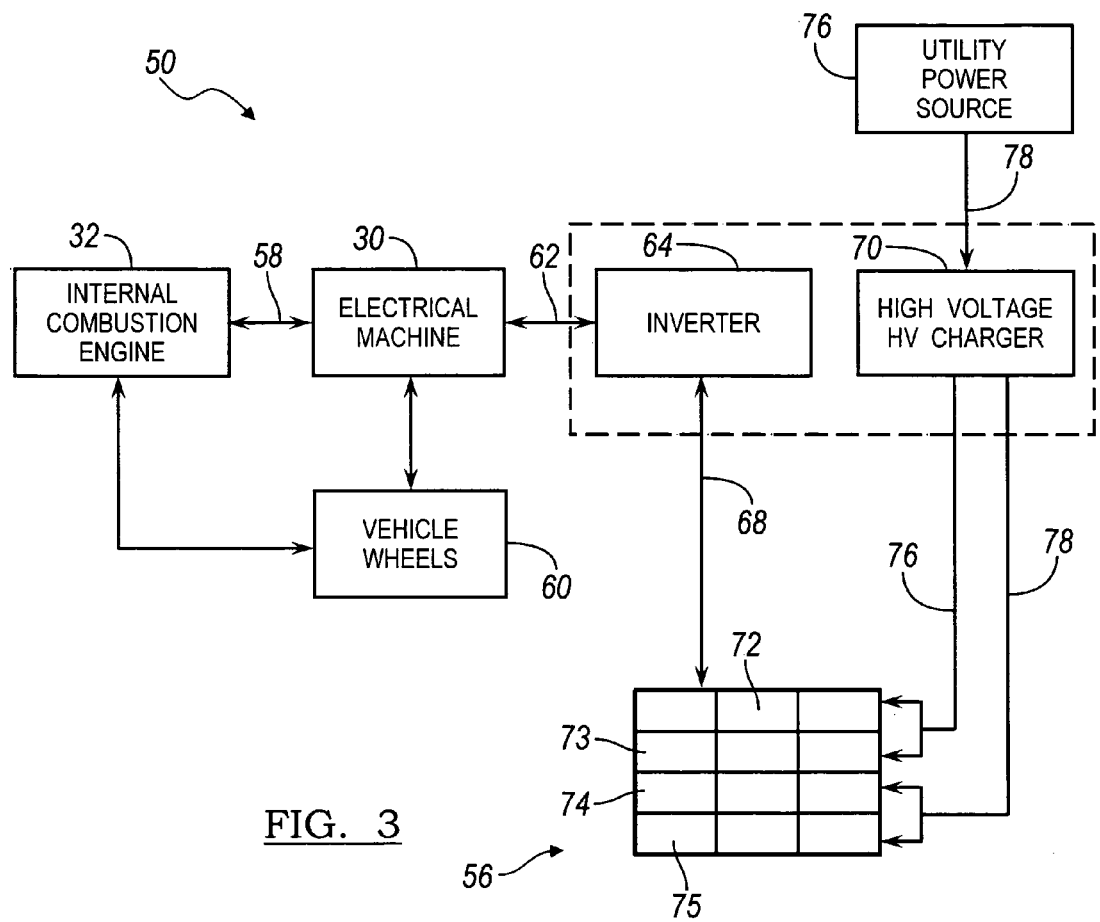
FIG. 3 is a schematic diagram showing a for the hybrid fuel cell/storage device system.

FIG. 3 illustrates schematically the architecture of a hybrid electric equalization system 50. Two power sources onboard the vehicle include the ICE 32 and electric machine 30, which may be a starter-generator or motor-generator. The electric machine 30 is driveably connected to the vehicle wheels 60 through series and/or parallel drive connections. The ICE 32 may drive the electric machine 30 when it operates in a generator mode, and the ICE may drive the vehicle wheels 60. The electric machine 30 may operate in a starter mode to start the ICE 32, in a motor mode to drive the vehicle wheels 60, and in a generator mode to charge electrically an energy storage device 56. In the generator mode, the electric machine 30 may be driven by the vehicle wheels, by the ICE 32 and by these in combination.

The ICE 32 is either continually driveably connected by a mechanical interface 58 to the electric machine 30. The mechanical interface 58 may be a portion of the powertrain of the motor vehicle or a clutch, which can be alternately engaged and disengaged. The output of the electric machine 30 is connected through an electric interface 62 to a motor inverter 64.

The motor inverter 64 converts AC current produced by the electric machine 30 to DC current, which is supplied on line 68 to the energy storage device 56, and it converts DC current from the energy storage device to AC current, which is supplied on lines 62, 68 to the electric machine 30.

The energy storage device 56 may be an electric storage battery, a battery pack, capacitors, or a combination of a storage battery and capacitors. When the energy storage device 56 comprises battery packs, they may be arranged in battery pack groups 72, 73, 74, 75, which are interconnected in any combination including series, parallel, and series-parallel connections.

A high voltage (HV) charger 70 and the energy storage device 56 may share two different electric interfaces 76, 78, thereby allowing the storage device 56 to be split while being charged, if desired. In this way, current from the HV charger 70 may be divided or split among the groups of battery packs 72-75, which comprise the energy storage device 56. The HV charger 70 may be located onboard the vehicle, in which case it may be integrated with the inverter 64 or a separate unit from the inverter. Alternatively, the HV charger 70 may be located external to the vehicle.

In either case, power from a source 76 external to the vehicle, such as an electric utility grid, is electrically connected by a line 78 to the HV charger 70. The external power source may supply single phase or three phase AC current to the charger 70. The charger 70 converts current from source 76 to DC current, which is supplied on lines 76, 78 to the energy storage device 56. The HV charger can supply energy at a magnitude that rebalances, i.e., fully recharges the energy storage device 56. A rebalancing charge is sometimes referred to as an equalization charge.

For the illustrated example of FIG. 2, the method used to modify the battery power request shifts curve 38 rightward allowing the vehicle to remain at a higher SOC capacity prior to recharge. This higher SOC provides operational flexibility, such as allowing the capacity of the charger 70 to be smaller, or the period required to perform an equalization charge of the energy storage device 56 to be shorter than they would be otherwise.

Use of alternate power sources, ICE 32 and external power source 76, provide control flexibility in optimizing costs associated with each of the power sources. For example, when gasoline or diesel fuel prices are relatively low compared to the cost of electric power from the AC external power source, controller 12 controls the electric machine 30 and ICE 32, either separately or in combination, to bulk charge the energy storage device 56, i.e., to charge the battery pack to a high (about 90%) SOC, and the controller uses the external AC power source 76 and charger 70 to provide the equalization charge, i.e., from the high SOC to a maximum (about 100%) SOC. When vehicle fuel costs rise relative to those of the cost of electric power from the AC power source 76, controller 12 controls the electric machine 30 and ICE 32, such that the ICE 32 and/or electric machine 30 are used to provide a bulk charge to the energy storage device 56 that is proportionately lower than high (90%) SOC, and the external power source 76 and charger 70 would be used for an equalization charge that is proportionately greater than a terminal, low (10%) SOC.

In accordance with the provisions of the patent statutes, the preferred embodiment has been described. However, it should be noted that the alternate embodiments can be practiced otherwise than as specifically illustrated and described.

What is claimed is:

1. A hybrid electric motor vehicle system for storing and supplying electrical power, comprising:
   an internal combustion engine;
   a motor-generator driveably connected to a vehicle wheel for producing AC electric power;
   an energy storage device for alternately storing and discharging electric power;

an inverter coupled to the motor-generator and the energy storage device for converting alternating current produced by the motor-generator to direct current transmitted to the energy storage device, and for converting direct current stored in the energy storage device to alternating current transmitted to the motor-generator;

a source of AC electric power located external to the vehicle;

a charger coupled to said electric power source and the energy storage device for supplying DC electric power to the energy storage device from said electric power source; and a controller configured to use a current state of charge of the energy storage device to determine five base electric power profile operating regions according in which the energy storage device is discharged and charged through the motor-generator and internal combustion engine to provide a bulk charge to the energy storage device, said regions comprising a fast active discharge region, an increasing active discharge region, a passive region, an increasing active charge region and a fast active charge region, wherein wherein-the controller uses the motor-generator and internal combustion to charge the battery pack to a relatively high state of charge by determining a modified electric power profile comprising five operating regions that shift the base electric power profile regions, respectively, in response to a need for high-voltage battery cell voltage equalization.

2. The power supply system of claim 1 wherein:

the controller prevents the motor-generator and internal combustion engine from bulk charging the energy storage device when the magnitude of electric power that can be discharged or charged currently by the energy storage device is above a reference magnitude.

* * * * *